US012399927B2

(12) United States Patent
Charlton et al.

(10) Patent No.: US 12,399,927 B2
(45) Date of Patent: *Aug. 26, 2025

(54) CONTEXTUAL MEDIA FILTER SEARCH

(71) Applicant: Snap Inc., Santa Monica, CA (US)

(72) Inventors: Ebony James Charlton, Los Angeles, CA (US); Hao Hu, Bellevue, WA (US); Yanjia Li, Torrance, CA (US); Xing Mei, Los Angeles, CA (US); Kevin Dechau Tang, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/299,908

(22) Filed: Apr. 13, 2023

(65) Prior Publication Data
US 2023/0325430 A1    Oct. 12, 2023

Related U.S. Application Data

(63) Continuation of application No. 17/306,179, filed on May 3, 2021, now Pat. No. 11,651,019, which is a
(Continued)

(51) Int. Cl.
*G06F 16/40*    (2019.01)
*G06F 3/0488*   (2022.01)
(Continued)

(52) U.S. Cl.
CPC ............ *G06F 16/40* (2019.01); *G06F 3/0488* (2013.01); *G06F 16/51* (2019.01); *G06F 16/538* (2019.01);
(Continued)

(58) Field of Classification Search
None
See application file for complete search history.

(56) References Cited

U.S. PATENT DOCUMENTS 5,577,135 A    11/1996   Grajski et al.
5,862,376 A    1/1999    Steele, Jr. et al.
(Continued)

FOREIGN PATENT DOCUMENTS

CN    101203170 A    6/2008
CN    104751475 A    7/2015
(Continued)

OTHER PUBLICATIONS

"International Application Serial No. PCT US2020 022343, International Search Report mailed May 28, 2020", 3 pgs.
(Continued)

*Primary Examiner* — Edward Martello
(74) *Attorney, Agent, or Firm* — Schwegman Lundberg & Woessner, P.A.

(57) ABSTRACT

Method for receiving an input onto a graphical user interface at a client device, capturing an image frame at the client device, the image frame comprising a depiction of an object, identifying the object within the image frame, accessing media content associated with the object within a media repository in response to identifying the object, and causing presentation of the media content within the image frame at the client device.

20 Claims, 11 Drawing Sheets

Related U.S. Application Data continuation of application No. 16/814,221, filed on Mar. 10, 2020, now Pat. No. 11,017,233.

(60) Provisional application No. 62/826,679, filed on Mar. 29, 2019.

(51) Int. Cl.
| | | |
|---|---|---|
| *G06F 16/51* | (2019.01) | |
| *G06F 16/538* | (2019.01) | |
| *G06T 7/60* | (2017.01) | |
| *G06T 11/00* | (2006.01) | |
| *G06V 10/75* | (2022.01) | |
| *G06V 20/20* | (2022.01) | |

(52) U.S. Cl.
CPC .............. *G06T 7/60* (2013.01); *G06T 11/00* (2013.01); *G06V 10/7553* (2022.01); *G06V 20/20* (2022.01); *G06T 2207/30242* (2013.01)

(56) References Cited

U.S. PATENT DOCUMENTS

| | | | |
|---|---|---|---|
| 6,182,115 B1 | 1/2001 | Cuomo et al. | |
| 6,275,935 B1 | 8/2001 | Barlow et al. | |
| 7,046,851 B2 * | 5/2006 | Keaton | G06F 18/21 707/E17.02 |
| 8,493,353 B2 | 7/2013 | Blanchflower et al. | |
| 8,719,857 B1 | 5/2014 | Ellis et al. | |
| 9,110,541 B1 | 8/2015 | Zhou et al. | |
| 9,272,208 B1 | 3/2016 | Le et al. | |
| 9,280,560 B1 | 3/2016 | Dube et al. | |
| 9,361,523 B1 | 6/2016 | Chen et al. | |
| 9,424,461 B1 * | 8/2016 | Yuan | G06V 20/647 |
| 9,684,941 B2 | 6/2017 | Filler | |
| 9,720,934 B1 | 8/2017 | Dube et al. | |
| 9,830,631 B1 | 11/2017 | Dhua et al. | |
| 9,892,242 B1 | 2/2018 | Hodge | |
| 9,954,996 B2 | 4/2018 | Christie et al. | |
| 10,149,958 B1 | 12/2018 | Tran et al. | |
| 10,257,202 B1 | 4/2019 | Jiang et al. | |
| 10,282,914 B1 | 5/2019 | Tran et al. | |
| 10,467,147 B1 | 11/2019 | Ahmed et al. | |
| 10,503,494 B1 | 12/2019 | Robinson et al. | |
| 10,606,824 B1 | 3/2020 | Fire et al. | |
| 10,636,062 B1 | 4/2020 | Mossoba et al. | |
| 10,681,063 B1 | 6/2020 | Silva et al. | |
| 10,699,124 B1 | 6/2020 | Herzberg et al. | |
| 10,798,574 B1 | 10/2020 | Indurkar et al. | |
| 11,017,233 B2 | 5/2021 | Charlton et al. | |
| 11,182,944 B1 | 11/2021 | Kondoh et al. | |
| 11,341,728 B2 | 5/2022 | Hu et al. | |
| 11,386,625 B2 | 7/2022 | Hu et al. | |
| 11,410,215 B1 | 8/2022 | Goetz et al. | |
| 11,417,154 B1 | 8/2022 | Moeykens | |
| 11,562,014 B1 | 1/2023 | Dermu | |
| 11,620,829 B2 | 4/2023 | Hu et al. | |
| 11,651,019 B2 | 5/2023 | Charlton et al. | |
| 11,775,132 B1 | 10/2023 | Mcdannald et al. | |
| 11,823,456 B2 | 11/2023 | Dela Rosa et al. | |
| 11,922,396 B1 | 3/2024 | Blumenthal | |
| 11,922,445 B1 | 3/2024 | Aery et al. | |
| 2004/0100483 A1 * | 5/2004 | Russell | G06V 10/46 707/E17.024 |
| 2008/0030575 A1 * | 2/2008 | Davies | H04N 7/185 348/92 |
| 2008/0080012 A1 | 4/2008 | Mock et al. | |
| 2009/0033679 A1 | 2/2009 | Borrel et al. | |
| 2009/0133037 A1 | 5/2009 | Allen et al. | |
| 2009/0293012 A1 * | 11/2009 | Alter | G06T 15/10 715/848 |
| 2009/0322671 A1 * | 12/2009 | Scott | G06F 3/013 345/173 |
| 2010/0255813 A1 | 10/2010 | Belrose et al. | |
| 2011/0115816 A1 * | 5/2011 | Brackney | H05B 47/10 700/295 |
| 2012/0284297 A1 | 11/2012 | Aguera-Arcas et al. | |
| 2013/0080172 A1 | 3/2013 | Talwar et al. | |
| 2013/0201182 A1 | 8/2013 | Kuroki et al. | |
| 2013/0202213 A1 | 8/2013 | Adamek et al. | |
| 2013/0346297 A1 | 12/2013 | Zuck et al. | |
| 2014/0029798 A1 | 1/2014 | Flynn et al. | |
| 2014/0078144 A1 | 3/2014 | Berriman et al. | |
| 2014/0130182 A1 | 5/2014 | Yackanich et al. | |
| 2014/0195650 A1 * | 7/2014 | Kelsen | H04L 67/02 709/219 |
| 2014/0214515 A1 | 7/2014 | Quirk et al. | |
| 2014/0247207 A1 | 9/2014 | Pahud et al. | |
| 2014/0267120 A1 | 9/2014 | Zhang et al. | |
| 2014/0289843 A1 | 9/2014 | Chiang et al. | |
| 2014/0317012 A1 | 10/2014 | Can et al. | |
| 2014/0340423 A1 | 11/2014 | Taylor et al. | |
| 2014/0362120 A1 | 12/2014 | Wohl et al. | |
| 2015/0070347 A1 * | 3/2015 | Hofmann | G06F 3/04815 345/419 |
| 2015/0206343 A1 | 7/2015 | Mattila et al. | |
| 2015/0242444 A1 | 8/2015 | Campbell et al. | |
| 2015/0262036 A1 | 9/2015 | Song et al. | |
| 2015/0310667 A1 | 10/2015 | Young et al. | |
| 2015/0348329 A1 | 12/2015 | Carre et al. | |
| 2015/0350207 A1 | 12/2015 | Kim et al. | |
| 2016/0014196 A1 | 1/2016 | Azulay et al. | |
| 2016/0048665 A1 | 2/2016 | Alshinnawi et al. | |
| 2016/0098619 A1 | 4/2016 | Gaidon et al. | |
| 2016/0189000 A1 | 6/2016 | Dube et al. | |
| 2016/0358230 A1 | 12/2016 | Wilson et al. | |
| 2016/0364394 A1 | 12/2016 | Bostick et al. | |
| 2016/0364590 A1 | 12/2016 | Wadley | |
| 2017/0024384 A1 * | 1/2017 | Kant | G06F 16/2246 |
| 2017/0061469 A1 | 3/2017 | Garrity et al. | |
| 2017/0323481 A1 | 11/2017 | Tran et al. | |
| 2017/0372046 A1 | 12/2017 | Thomee et al. | |
| 2018/0069937 A1 | 3/2018 | Kolleri | |
| 2018/0082430 A1 | 3/2018 | Sharma et al. | |
| 2018/0114087 A1 | 4/2018 | Kamen et al. | |
| 2018/0159971 A1 | 6/2018 | Yang et al. | |
| 2018/0164995 A1 | 6/2018 | Czupi | |
| 2018/0165888 A1 | 6/2018 | Duan et al. | |
| 2018/0184038 A1 | 6/2018 | Li | |
| 2018/0255947 A1 | 9/2018 | Wilkinson et al. | |
| 2018/0260660 A1 | 9/2018 | Gopalan et al. | |
| 2018/0286081 A1 | 10/2018 | Koperski et al. | |
| 2018/0350119 A1 | 12/2018 | Kocharlakota et al. | |
| 2019/0034667 A1 | 1/2019 | Zhou | |
| 2019/0096135 A1 | 3/2019 | Dal Mutto et al. | |
| 2019/0102922 A1 | 4/2019 | Gum | |
| 2019/0207678 A1 | 7/2019 | Aoyama et al. | |
| 2019/0236167 A1 | 8/2019 | Hu et al. | |
| 2019/0251570 A1 | 8/2019 | Song | |
| 2019/0253700 A1 | 8/2019 | Tornéus et al. | |
| 2019/0311335 A1 | 10/2019 | Greiner et al. | |
| 2019/0362154 A1 | 11/2019 | Moore et al. | |
| 2019/0392058 A1 | 12/2019 | Konow Krause et al. | |
| 2020/0050324 A1 | 2/2020 | Gavara | |
| 2020/0074672 A1 | 3/2020 | Hoff | |
| 2020/0077144 A1 | 3/2020 | Zavesky et al. | |
| 2020/0082668 A1 | 3/2020 | Foley et al. | |
| 2020/0090409 A1 | 3/2020 | Fink et al. | |
| 2020/0125707 A1 | 4/2020 | Lin | |
| 2020/0204739 A1 | 6/2020 | Beres et al. | |
| 2020/0279305 A1 | 9/2020 | Mossoba et al. | |
| 2020/0311426 A1 | 10/2020 | Charlton et al. | |
| 2020/0372294 A1 | 11/2020 | Koval et al. | |
| 2021/0004589 A1 | 1/2021 | Turkelson et al. | |
| 2021/0064728 A1 | 3/2021 | Kadambala et al. | |
| 2021/0073543 A1 | 3/2021 | Herzberg et al. | |
| 2021/0121782 A1 | 4/2021 | Døssing et al. | |
| 2021/0141880 A1 | 5/2021 | Pauli et al. | |
| 2021/0152975 A1 | 5/2021 | Hohman | |
| 2021/0256498 A1 | 8/2021 | Detitta | |
| 2021/0406041 A1 | 12/2021 | Saraiya et al. | |
| 2021/0409539 A1 | 12/2021 | Arellano et al. | |
| 2022/0067580 A1 | 3/2022 | Rho et al. | |

(56) References Cited

U.S. PATENT DOCUMENTS

| | | | |
|---|---|---|---|
| 2022/0092307 A1 | 3/2022 | Charlton et al. | |
| 2022/0101011 A1 | 3/2022 | Dela Rosa et al. | |
| 2022/0101033 A1 | 3/2022 | Hu et al. | |
| 2022/0101608 A1 | 3/2022 | Hu et al. | |
| 2022/0101609 A1 | 3/2022 | Hu et al. | |
| 2022/0148302 A1 | 5/2022 | Bao et al. | |
| 2022/0157047 A1 | 5/2022 | Truong et al. | |
| 2022/0167161 A1 | 5/2022 | Sheffield et al. | |
| 2022/0179665 A1* | 6/2022 | Rathod | G06F 9/451 |
| 2022/0244989 A1 | 8/2022 | Ryan et al. | |
| 2022/0335815 A1 | 10/2022 | Dice et al. | |
| 2022/0382729 A1 | 12/2022 | Wu et al. | |
| 2022/0398306 A1 | 12/2022 | Misra et al. | |
| 2023/0029251 A1 | 1/2023 | Zhang et al. | |
| 2023/0117441 A1 | 4/2023 | Mcmichael et al. | |
| 2023/0120950 A1 | 4/2023 | Ranjan | |
| 2023/0252392 A1 | 8/2023 | Courcelle et al. | |
| 2023/0401802 A1 | 12/2023 | Maschmeyer et al. | |
| 2024/0265145 A1 | 8/2024 | Cheng et al. | |

FOREIGN PATENT DOCUMENTS

| | | |
|---|---|---|
| CN | 107590453 A | 1/2018 |
| CN | 108305317 A | 7/2018 |
| CN | 109902190 A | 6/2019 |
| CN | 111311758 A | 6/2020 |
| CN | 113906413 | 1/2022 |
| WO | WO-2016077493 A1 | 5/2016 |
| WO | WO-2020187705 A1 | 9/2020 |
| WO | 2020205197 | 10/2020 |
| WO | WO-2024167918 A1 | 8/2024 |

OTHER PUBLICATIONS

"International Application Serial No. PCT US2020 022343, Written Opinion mailed May 28, 2020", 7 pgs.

"U.S. Appl. No. 16/814,221, Notice of Allowance mailed Jan. 25, 2021", 20 pgs.

"International Application Serial No. PCT US2020 022343, International Preliminary Report on Patentability mailed Oct. 14, 2021", 9 pgs.

"U.S. Appl. No. 17/306,179, Non Final Office Action mailed Jan. 20, 2022", 12 pgs.

"U.S. Appl. No. 17/306,179, Response filed Jun. 20, 2022 to Non Final Office Action mailed Jan. 20, 2022", 9 pgs.

"U.S. Appl. No. 17/306,179, Final Office Action mailed Aug. 25, 2022", 33 pgs.

"U.S. Appl. No. 17/306,179, Response filed Nov. 23, 2022 to Final Office Action mailed Aug. 25, 2022", 10 pgs.

"U.S. Appl. No. 17/306,179, Notice of Allowance mailed Jan. 10, 2023", 8 pgs.

"European Application Serial No. 20718873.1, Communication Pursuant to Article 94(3) EPC mailed Dec. 22, 2023", 9 pgs.

Roman, Daniel, "Snapchat New AR Filters", Youtube, [Online] Retrieved from the Internet:URL:https: www.youtube.com watch?v=E8NKAPGL1HQ, (Apr. 18, 2017), 2:00 min.; 27 pgs.

"Korean Application Serial No. 10-2021-7034733, Response filed Jul. 12, 2024 to Notice of Preliminary Rejection mailed Apr. 12, 2024", W/ English Claims, 29 pgs.

"Korean Application Serial No. 10-2021-7034733, Notice of Preliminary Rejection mailed Apr. 12, 2024", w/ English Translation, 15 pgs.

U.S. Appl. No. 16/949,074 U.S. Pat. No. 11,620,829 filed Oct. 13, 2020, Visual Matching With a Messaging Application.

U.S. Appl. No. 17/378,259 U.S. Pat. No. 11,823,456 filed Jul. 16, 2021, Visual Matching With a Messaging Application.

"U.S. Appl. No. 16/949,074, 312 Amendment filed Feb. 14, 2023", 7 pgs.

"U.S. Appl. No. 16/949,074, Non Final Office Action mailed Aug. 11, 2022", 16 pgs.

"U.S. Appl. No. 16/949,074, Notice of Allowance mailed Nov. 18, 2022", 7 pgs.

"U.S. Appl. No. 16/949,077, Non Final Office Action mailed Oct. 15, 2021", 10 pgs.

"U.S. Appl. No. 16/949,077, Notice of Allowance mailed Mar. 9, 2022", 16 pgs.

"U.S. Appl. No. 16/949,077, Response filed Jan. 7, 2022 to Non Final Office Action mailed Oct. 15, 2021", 9 pgs.

"U.S. Appl. No. 16/949,079, Non Final Office Action mailed Jul. 8, 2021", 22 pgs.

"U.S. Appl. No. 16/949,079, Notice of Allowability mailed Mar. 3, 2022", 2 pgs.

"U.S. Appl. No. 16/949,079, Notice of Allowance mailed Feb. 14, 2022", 10 pgs.

"U.S. Appl. No. 16/949,079, Response filed Oct. 5, 2021 to Non Final Office Action mailed Jul. 8, 2021", 9 pgs.

"U.S. Appl. No. 17/378,259, Corrected Notice of Allowability mailed Jun. 28, 2023", 2 pgs.

"U.S. Appl. No. 17/378,259, Non Final Office Action mailed Feb. 22, 2023", 20 pgs.

"U.S. Appl. No. 17/378,259, Notice of Allowance mailed Jun. 13, 2023", 9 pgs.

"U.S. Appl. No. 17/378,259, Response filed May 22, 2023 to Non Final Office Action mailed Feb. 22, 2023", 9 pgs.

"International Application Serial No. PCT/US2024/014615, International Search Report mailed May 8, 2024", 4 pgs.

"International Application Serial No. PCT/US2024/014615, Written Opinion mailed May 8, 2024", 11 pgs.

"Response filed Oct. 27, 2022 to Non-Final Office Action dated Aug. 11, 2022.", 9 pgs.

"U.S. Appl. No. 18/165,747, Non Final Office Action mailed Jan. 21, 2025", 25 pgs.

"Korean Application Serial No. 10-2021-7034733, Final Office Action mailed Jan. 23, 2025", w/ English translation, 7 pgs.

"Chinese Application Serial No. 202080039257.1, Office Action mailed May 15, 2025", W/ English Translation, 16 pgs.

* cited by examiner

CONTEXTUAL MEDIA FILTER SEARCH

PRIORITY

This application is a continuation of U.S. application Ser. No. 17/306,179, filed May 3, 2021, which is a continuation of U.S. application Ser. No. 16/814,221, filed Mar. 10, 2020, which claims the benefit of priority to U.S. Provisional Patent application Ser. No. 62/826,679, filed Mar. 29, 2019, each of which is incorporated by reference herein in its entirety.

TECHNICAL FIELD

Embodiments of the present disclosure relate generally to mobile computing technology and, more particularly, but not by way of limitation, to systems for generating and displaying dynamic contextual media content at a client device.

BACKGROUND

Augmented reality (AR), is a live direct or indirect view of a physical, real-world environment whose elements are augmented by computer-generated sensory inputs.

BRIEF DESCRIPTION OF THE DRAWINGS

To easily identify the discussion of any particular element or act, the most significant digit or digits in a reference number refer to the figure number in which that element is first introduced.

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

To easily identify the discussion of any particular element or act, the most significant digit or digits in a reference number refer to the figure number in which that element is first introduced.

Figure 1:
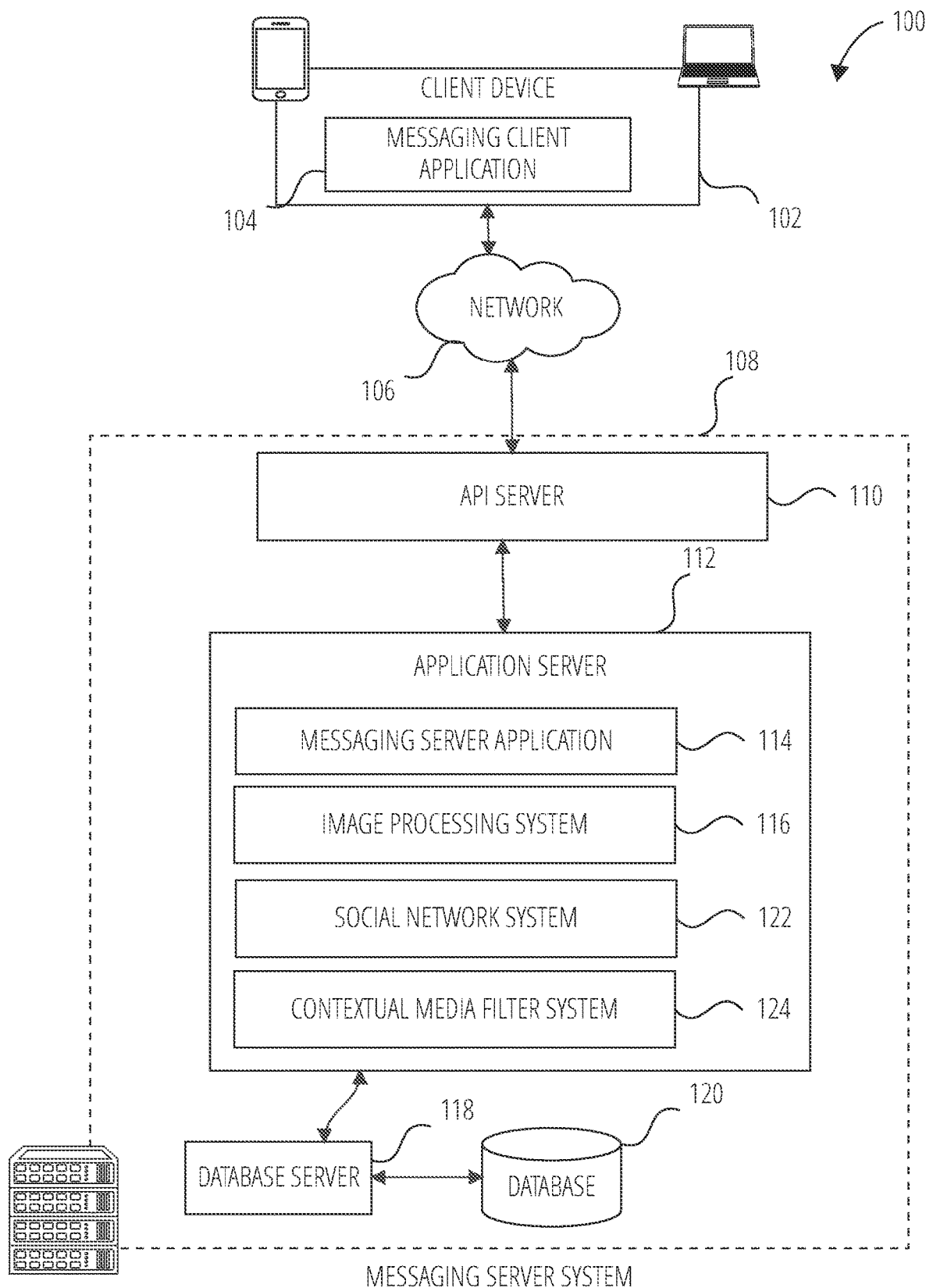

FIG. 1 is a diagrammatic representation of a networked environment in which the present disclosure may be deployed, in accordance with some example embodiments.

Figure 2:
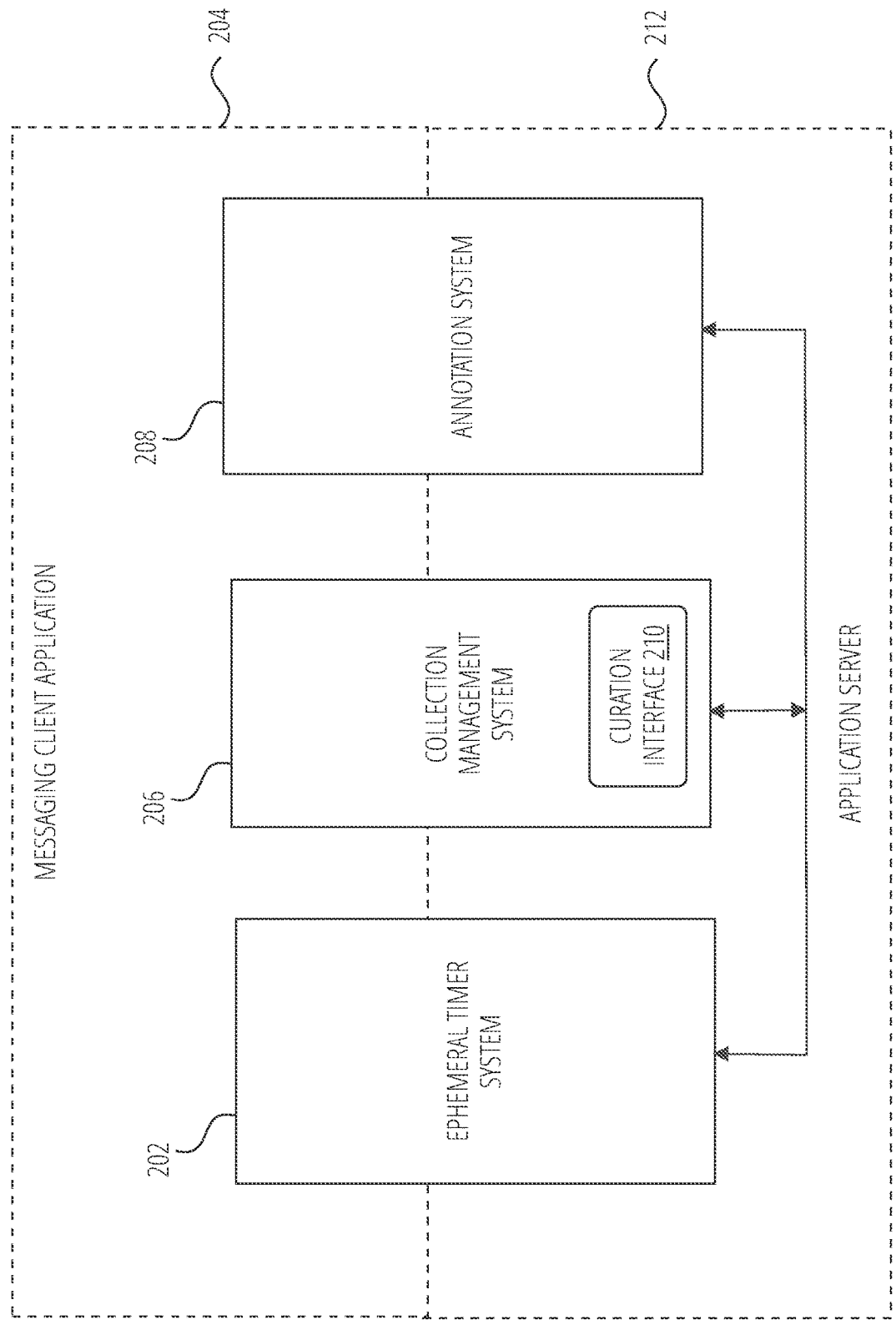

FIG. 2 is a diagrammatic representation of a messaging client application, in accordance with some example embodiments.

Figure 3:
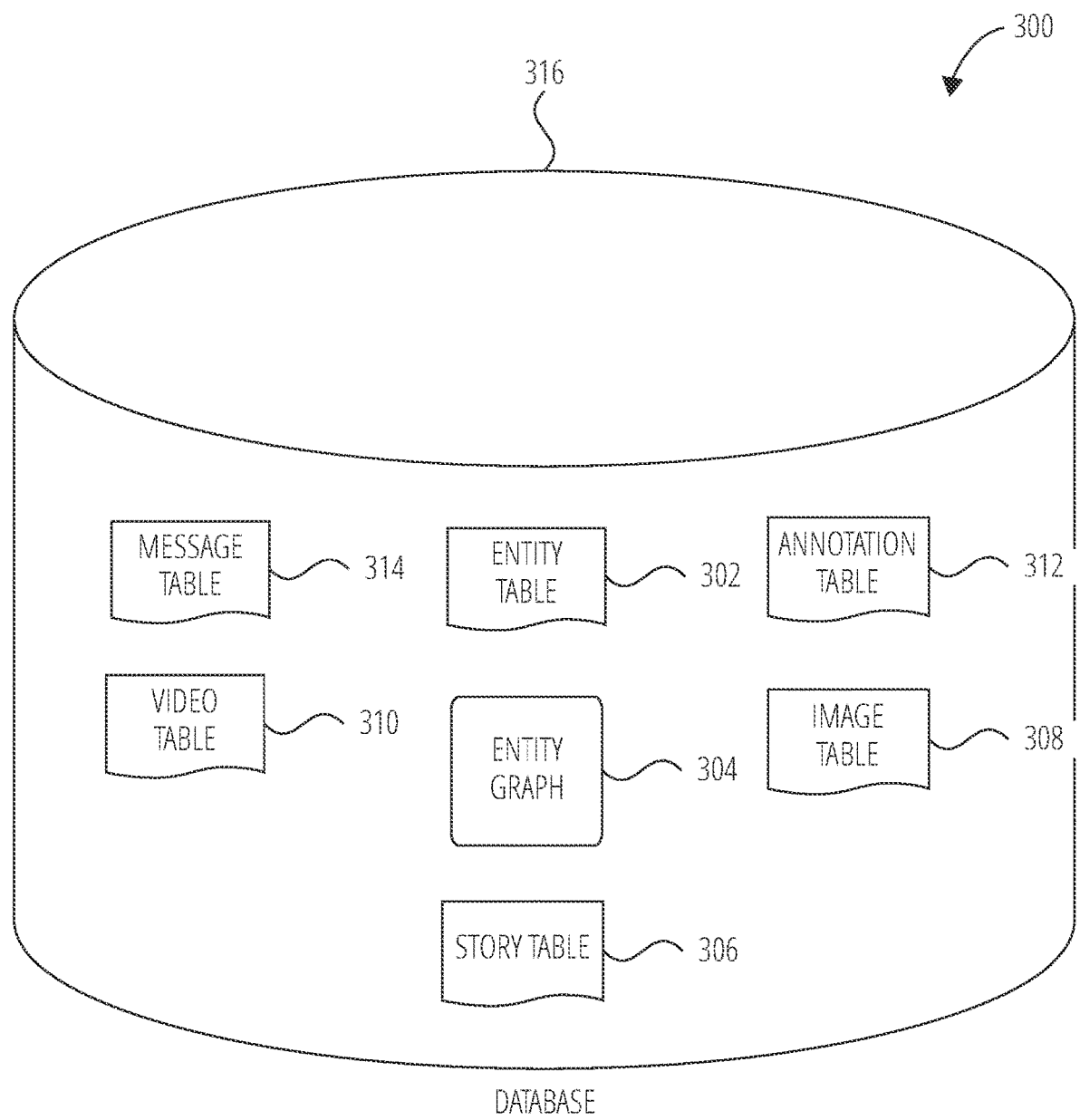

FIG. 3 is a diagrammatic representation of a data structure as maintained in a database, in accordance with some example embodiments.

Figure 4:
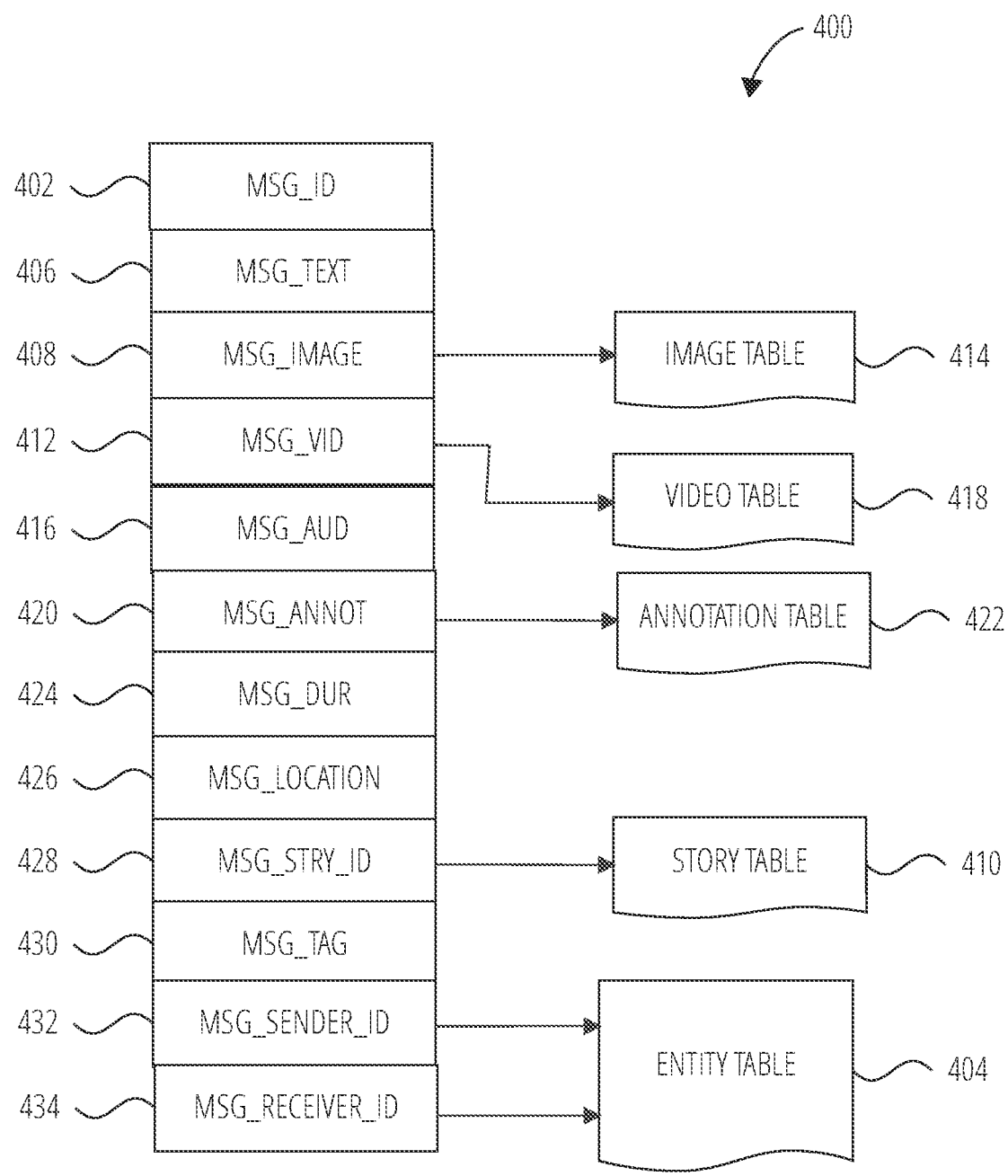

FIG. 4 is a diagrammatic representation of a message, in accordance with some example embodiments.

Figure 5:
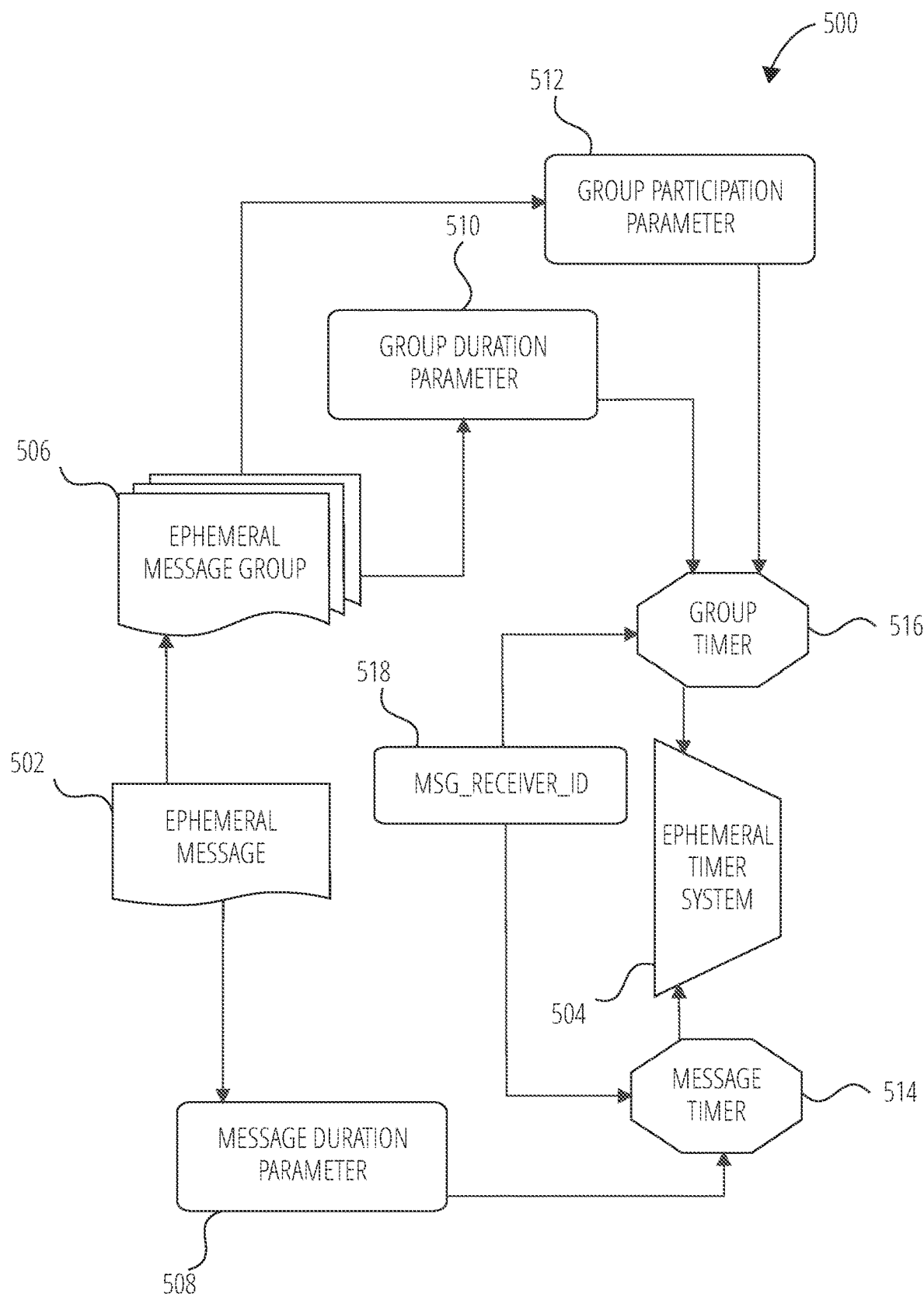

FIG. 5 is a flowchart for an access-limiting process, in accordance with some example embodiments.

Figure 6:
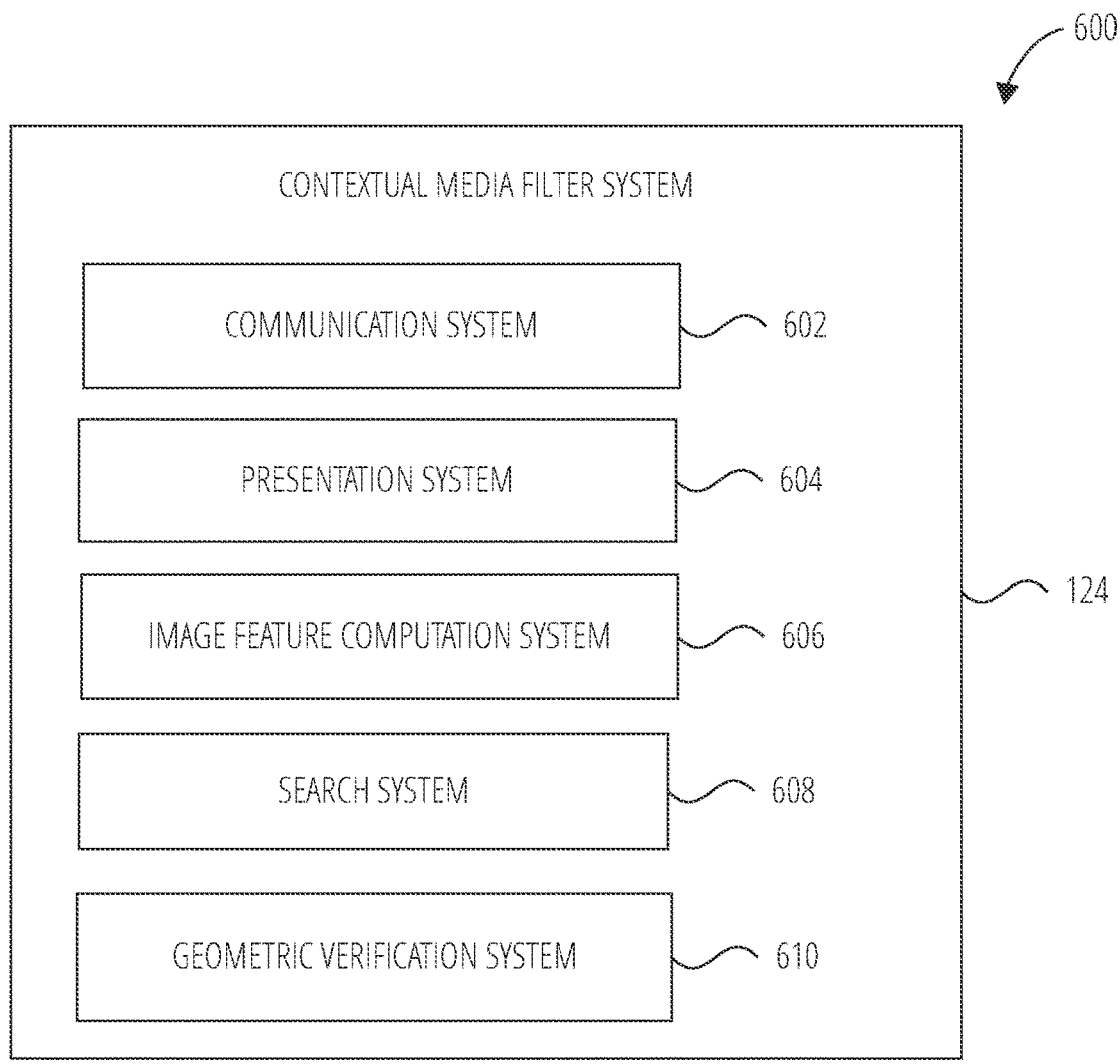

FIG. 6 is a block diagram illustrating components of the contextual media filter system, according to some example embodiments.

Figure 7:
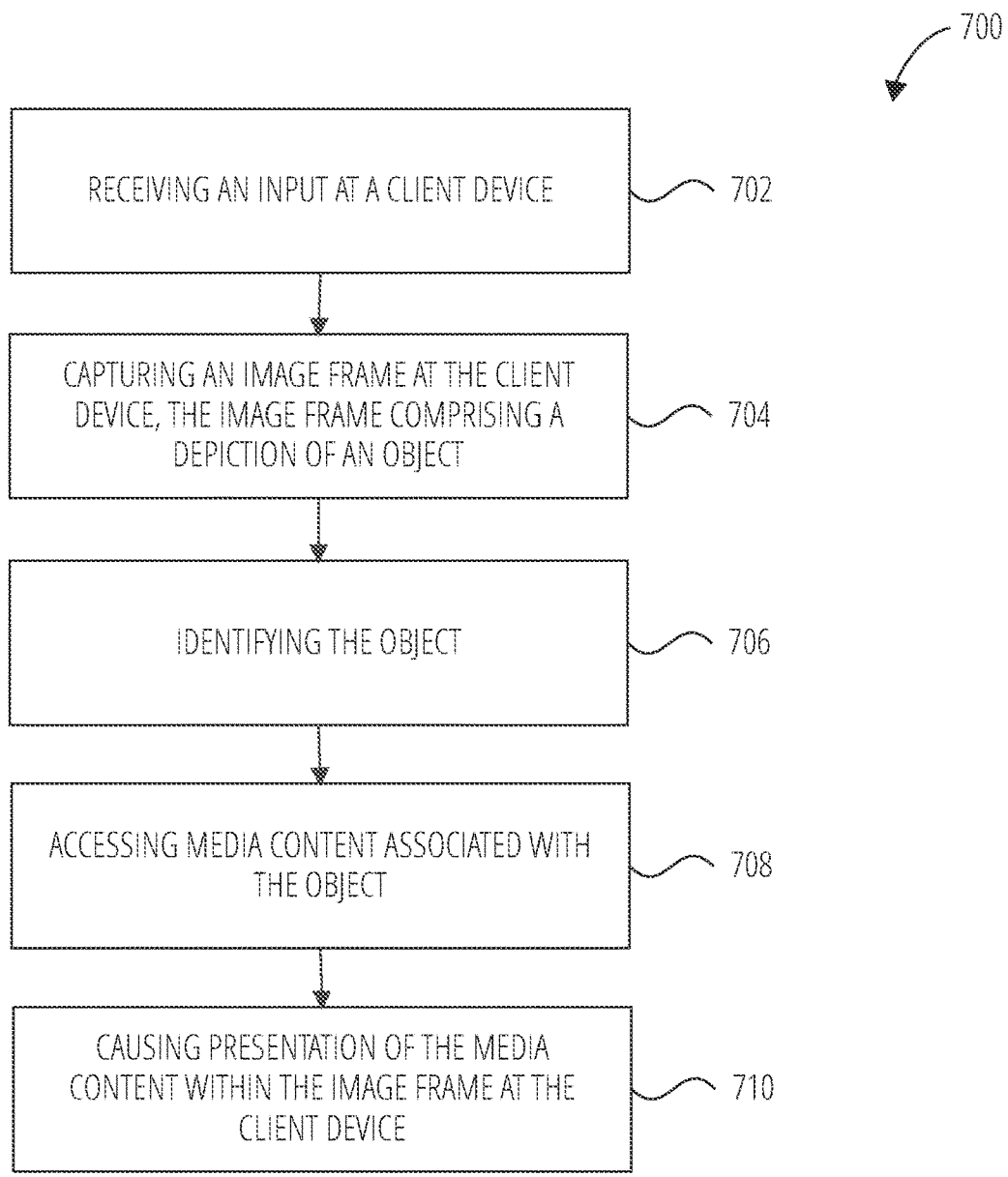

FIG. 7 is a flowchart depicting a method of causing display of a contextual media filter according to certain example embodiments.

Figure 8:
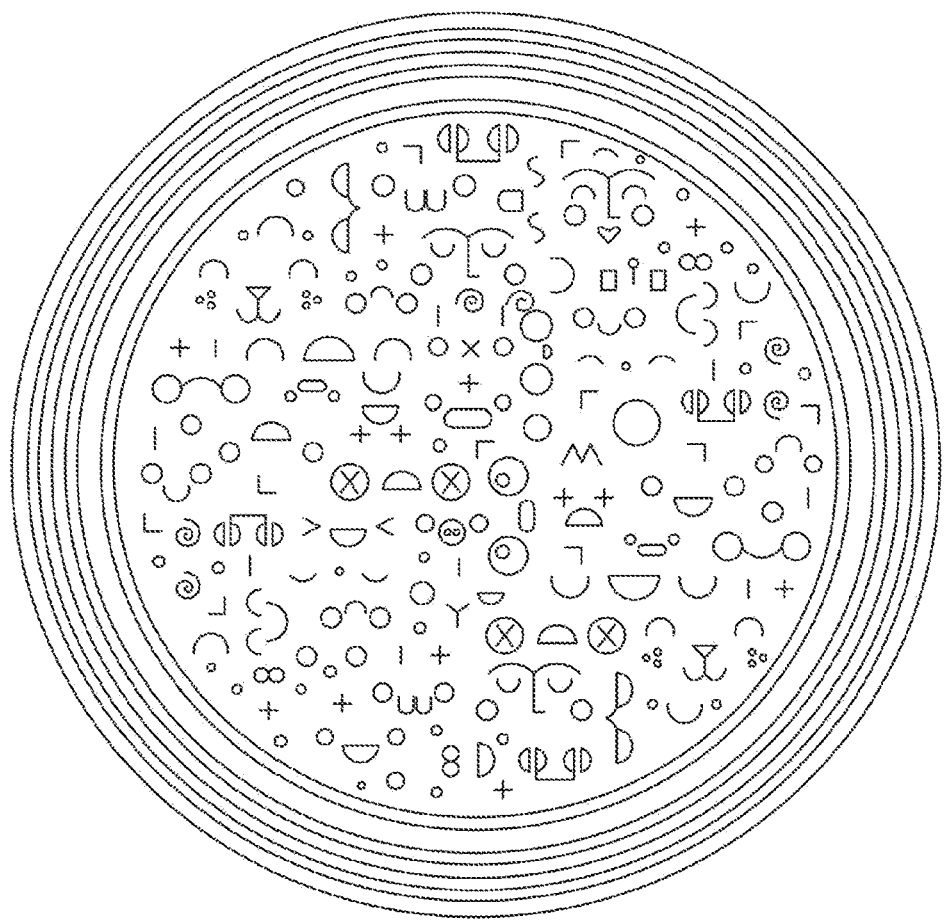

FIG. 8 is a diagrammatic illustration of an object within an image frame, according to some example embodiments.

Figure 9:
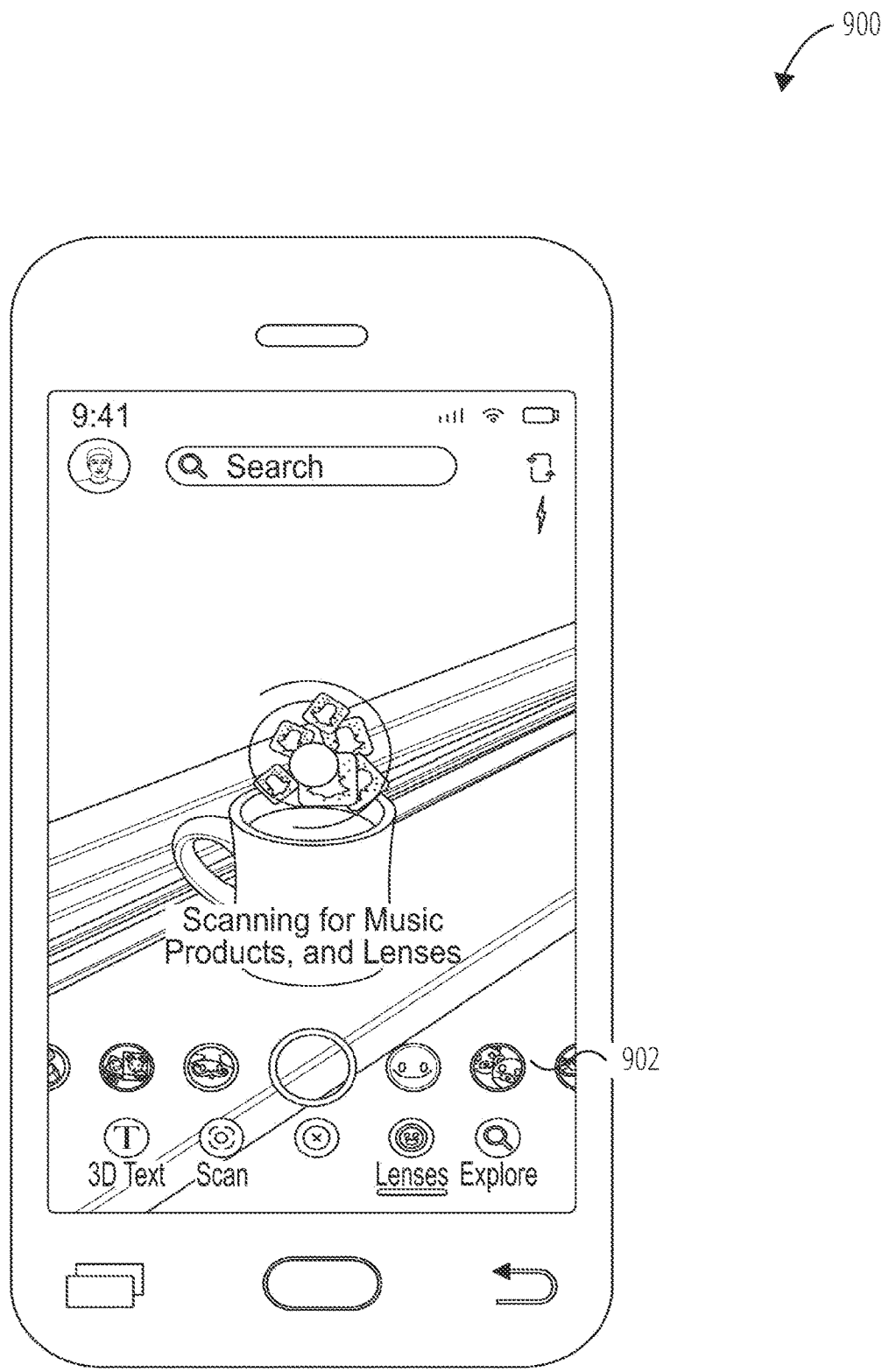

FIG. 9 is a diagrammatic illustration of a contextual media filter system within a user interface, according to some example embodiments.

Figure 10:
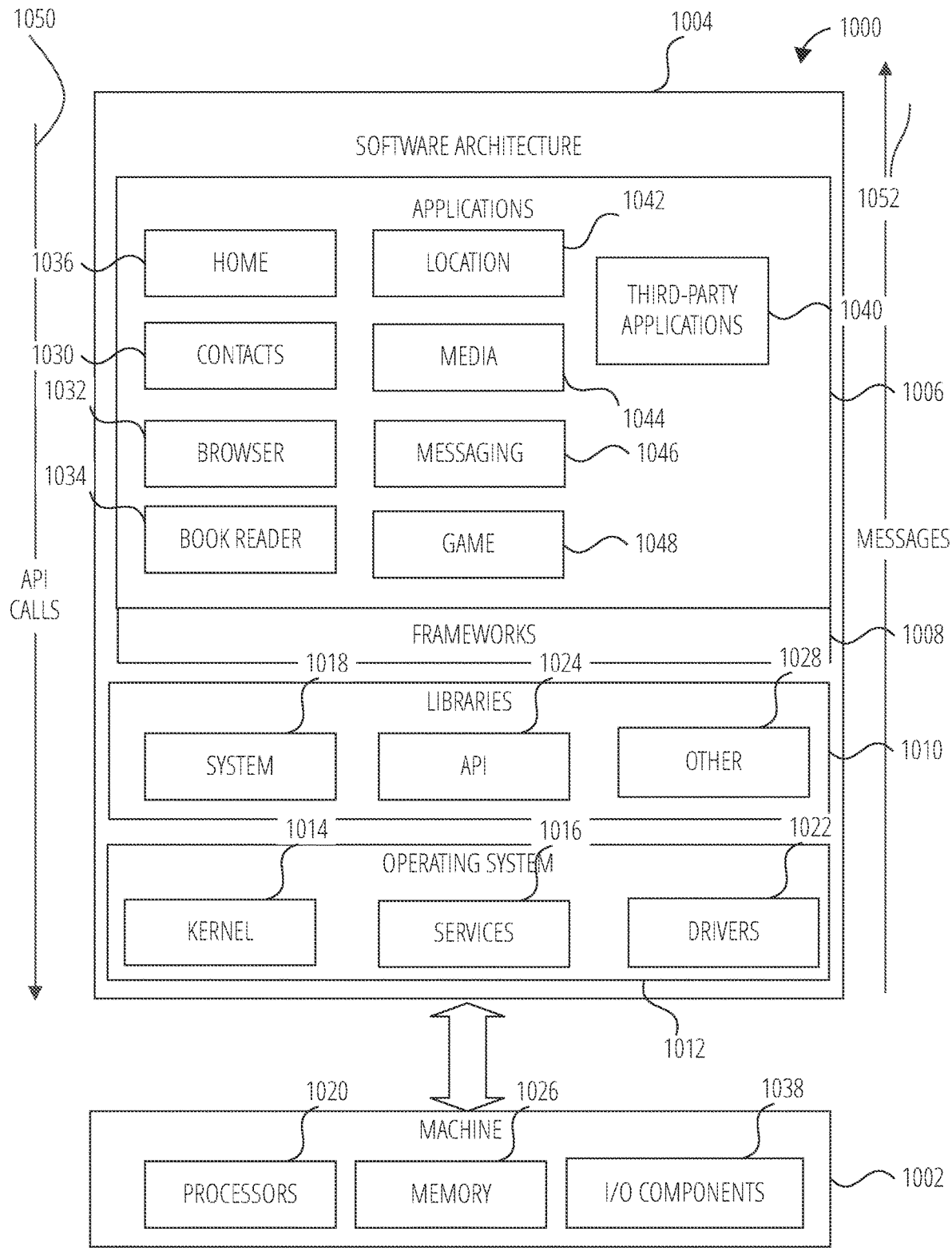

FIG. 10 is block diagram showing a software architecture within which the present disclosure may be implemented, in accordance with some example embodiments.

Figure 11:
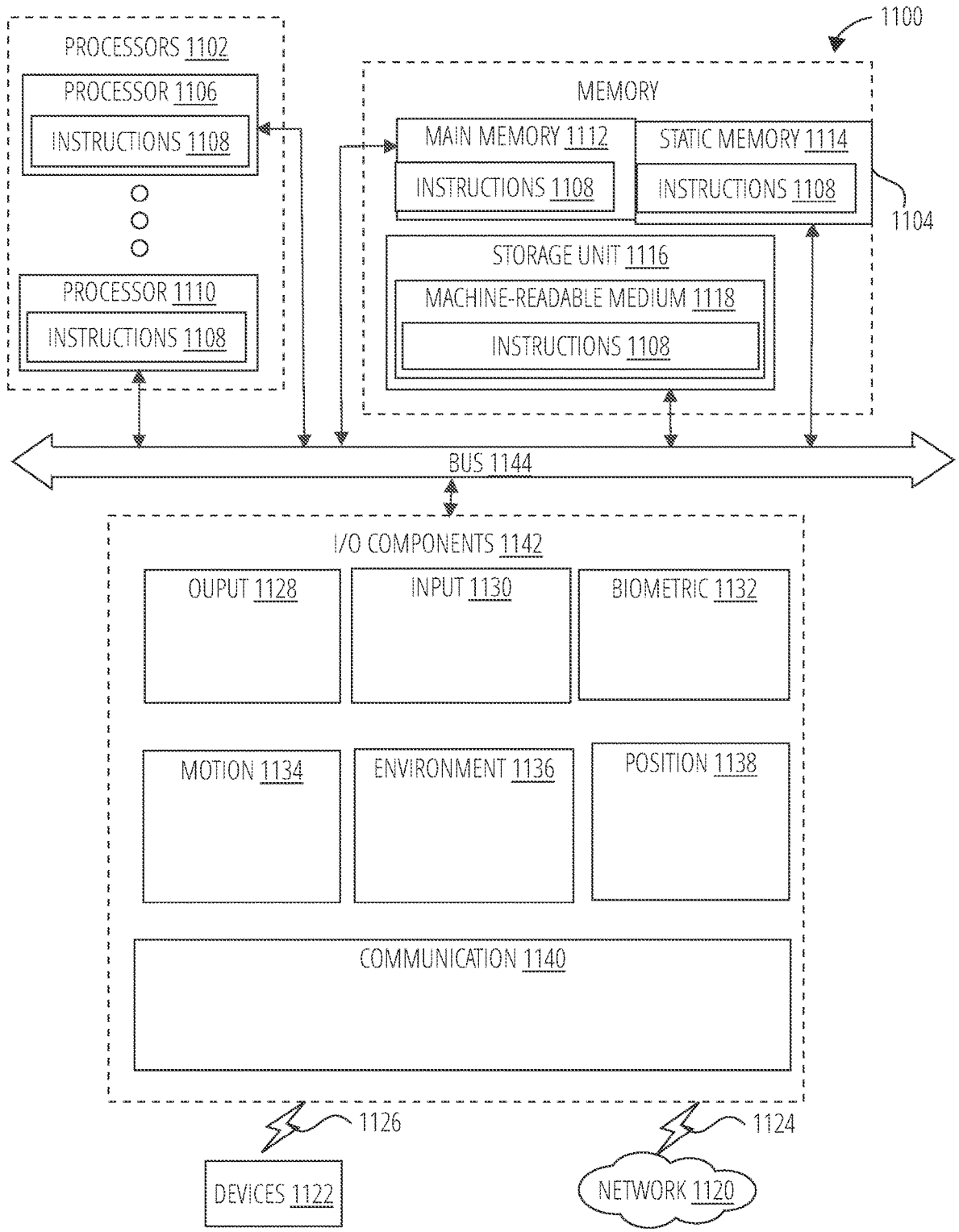

FIG. 11 is a diagrammatic representation of a machine, in the form of a computer system within which a set of instructions may be executed for causing the machine to perform any one or more of the methodologies discussed, in accordance with some example embodiments.

DETAILED DESCRIPTION

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

AR systems provide users within graphical user interfaces (GUIs) to display a live direct or indirect view of a physical, real-world environment, wherein elements of the view are augmented by computer-generated sensory inputs. For example, an AR interface may present media content at positions within a display of a view of a real-world environment, such that the media content appears to interact with elements in the real-world environment.

Aspects of the present disclosure describe a contextual media filter system configured to generate and display contextual media filters at a client device. For example, the contextual media filter system is configured to perform operations that include, receiving an input onto a graphical user interface at a client device, capturing an image frame at the client device, the image frame comprising a depiction of an object, identifying the object within the image frame, accessing media content associated with the object within a media repository in response to identifying the object, and causing presenting of the media content within the image frame at the client device.

The media content may include animated Graphics Interchange Format (GIF) images, of various shapes, sizes and themes. In some embodiments, the contextual media filter system may be in communication with a media repository that comprises a sorted and labeled collection of the media content, wherein the media content within the collection of media content is labeled or tagged based on attributes of the media content. For example, the media content may be tagged with a label that identifies an object category of the media content, such as "food," or "basketball," such that a reference to the object category corresponds with a set of media content from among the collection of media content.

In some embodiments, responsive to receiving an input that selects a user option from among a set of user options, the contextual media filter system captures an image from a client device, wherein the image frame comprises a depiction of one or more objects in a real-world environment. For example, the contextual media filter system may detect one or more local features (e.g., first set of features) within the image frame, wherein the local features identify an object associated with the object depicted in the image frame, or in further embodiments may also employ one or more image and text recognition techniques to identify the object depicted in the image frame. Based on the identification of the object, the contextual media filter system retrieves a set of representative features associated with the local features to compute global features (e.g., second set of features) of the image frame. The contextual media filter system may use the global features and query a media repository to identify media content based on the local features and the representative features. The contextual media filter system further geometrically verifies the media content using the local features and eliminates false media content from the media content.

In response to identifying the set of media content from the media repository, the contextual media filter system generates and causes display of the set of media content at the client device. In some embodiments, to generate the presentation of the set of media content, the contextual media filter system retrieves a media template that provides a presentation format and layout for the set of media content. For example, the media template may define positions to present the set of media content within the image frame at the client device. In some embodiments, the presentation of the set of media content within the image frame at the client device may be based on a position (or positions) of the objects identified within the image frame.

FIG. 1 is a block diagram showing an example messaging system 100 for exchanging data (e.g., messages and associated content) over a network. The messaging system 100 includes multiple instances of a client device 102, each of which hosts a number of applications including a messaging client application 104. Each messaging client application 104 is communicatively coupled to other instances of the messaging client application 104 and a messaging server system 108 via a network 106 (e.g., the Internet).

A messaging client application 104 is able to communicate and exchange data with another messaging client application 104 and with the messaging server system 108 via the network 106. The data exchanged between messaging client application 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

The Application Program Interface (API) server 110 receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, and opening an application event (e.g., relating to the messaging client application 104).

The application server 112 hosts a number of applications and subsystems, including a messaging server application 114, an image processing system 116, a social network system 122 and a contextual media filter system 124.

The contextual media filter system 124 is configured to capture an image frame that includes a depiction of an object from a client device 102, identify one or more objects within the image frame based on the depiction of the object, identify one or more image features based on the object, retrieve a set of media content based on the image features, and cause display of a presentation of the set of media content within the image frame at the client device 102, according to some example embodiments. Further details of the contextual media filter system 124 can be found in FIG. 6 below.

The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services and makes these functions and services available to the messaging server application 114. To this end, the social network system 122 maintains and accesses an entity graph 304 (as shown in FIG. 3) within the database 120. Examples of functions and services supported by the social network system 122 include the identification of other users of the messaging system 100 with which a particular user has relationships or is "following", and also the identification of other entities and interests of a particular user.

The application server 112 is communicatively coupled to a database server 118, which facilitates access to a database 120 in which is stored data associated with messages processed by the messaging server application 114.

FIG. 2 is block diagram illustrating further details regarding the messaging system 100, according to example embodiments. Specifically, the messaging system 100 is shown to comprise the messaging client application 204 and the application server 212, which in turn embody a number of some subsystems, namely an ephemeral timer system 202, a collection management system 206 and an annotation system 208.

The ephemeral timer system 202 is responsible for enforcing the temporary access to content permitted by the messaging client application 204 and the messaging server application 114. To this end, the ephemeral timer system 202 incorporates a number of timers that, based on duration and display parameters associated with a message, or collection of messages (e.g., a story), selectively display and enable access to messages and associated content via the messaging client application 204. Further details regarding the operation of the ephemeral timer system 202 are provided below.

The collection management system 206 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 206 may also be responsible for publishing an icon that provides notification of the existence of a particular collection to the user interface of the messaging client application 204.

The collection management system 206 furthermore includes a curation interface 210 that allows a collection manager to manage and curate a particular collection of content. For example, the curation interface 210 enables an event organizer to curate a collection of content relating to a specific event (e.g., delete inappropriate content or redundant messages). Additionally, the collection management system 206 employs machine vision (or image recognition technology) and content rules to automatically curate a content collection. In certain embodiments, compensation may be paid to a user for inclusion of user-generated content into a collection. In such cases, the curation interface 210 operates to automatically make payments to such users for the use of their content.

The annotation system 208 provides various functions that enable a user to annotate or otherwise modify or edit media content associated with a message. For example, the annotation system 208 provides functions related to the generation and publishing of media overlays for messages processed by the messaging system 100. The annotation system 208 operatively supplies a media overlay or supplementation (e.g., an image filter) to the messaging client application 204 based on a geolocation of the client device 102. In another example, the annotation system 208 operatively supplies a media overlay to the messaging client application 204 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the annotation system 208 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 208 provides a user-based publication platform that enables users to select a geolocation on a map, and upload content associated with the selected geolocation. The user may also specify circumstances under which a particular media overlay should be offered to other users. The annotation system 208 generates a media overlay that includes the uploaded content and associates the uploaded content with the selected geolocation.

In another example embodiment, the annotation system 208 provides a merchant-based publication platform that enables merchants to select a particular media overlay associated with a geolocation via a bidding process. For example, the annotation system 208 associates the media overlay of a highest bidding merchant with a corresponding geolocation for a predefined amount of time.

FIG. 3 is a schematic diagram illustrating data structures 300 which may be stored in the database 316 of the messaging server system 108, according to certain example embodiments. While the content of the database 316 is shown to comprise a number of tables, it will be appreciated that the data could be stored in other types of data structures (e.g., as an object-oriented database).

The database 316 includes message data stored within a message table 314. The entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 316 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102, or the current time.

Other annotation data that may be stored within the image table 308 is so-called Lenses® data. Lenses® may be a real-time special effect and sound that may be added to an image or a video.

In a social messaging system, content (e.g. images and video clips) may be communicated as part of the messaging. One way of customizing such content is the use of Lenses® which modifies or transforms the content in some way. For example, complex additions or transformations to the content images may be performed using Lenses® data, such as adding rabbit ears to the head of a person in a video clip, adding floating hearts with background coloring to a video clip, altering the proportions of a person's features within a video clip, or many numerous other such transformations. In order to both provide unique user experiences, to provide attribution to Lenses® creators, and to enable creators to protect various aspects of data within the messaging system, the system may provide tools both for users to generate and share such Lenses®, as well as limiting access to such filters in various ways. As described above, Lenses® in accordance with embodiments described herein refer to modifications that may be made to videos or images. This includes both real-time modification which modifies an image as it is captured using a device sensor and then displayed on a screen of the device with the 1e Lenses® ns modifications. This also includes modifications to stored content, such as video clips in a gallery that may be modified using Lenses®. For example, in a creator profile with multiple Lenses®, an authorized third party account may use a single video clip with multiple Lenses® to see how the different Lenses® will modify the stored clip. Similarly, real-time video capture may be used with Lenses® to show how video images currently being captured by sensors of a device would modify the captured data. Such data may simply be displayed on the screen and not stored in memory, or the content captured by the device sensors may be recorded and stored in memory with or without the Lenses® modifications (or both).

Lenses® data and various systems to use Lenses® and modify content using Lenses® may thus involve detection of objects (e.g. faces, hands, bodies, cats, dogs, surfaces, objects, etc), tracking of such objects as they leave, enter, and move around the field of view in video frames, and the modification or transformation of such objects as they are tracked. I various embodiments, different methods for achieving such transformations may be used. For example, some embodiments may involve generating a three-dimensional mesh model of the object or objects, and using transformations and animated textures of the model within the video to achieve the transformation. In other embodiments, tracking of points on an object may be used to place an image or texture (which may be two dimensional or three dimensional) at the tracked position. In still further embodiments, neural network analysis of video frames may be used to place images, models, or textures in content (e.g. images or frames of video). Lenses® data thus refers both to the images, models, and textures used to create transformations in content, as well as to additional modeling and analysis information needed to achieve such transformations with object detection, tracking, and placement.

Real time video processing can be performed with any kind of video data, (e.g. video streams, video files, etc.) saved in a memory of a computerized system of any kind. For example, a user can load video files and save them in a memory of a device, or can generate a video stream using sensors of the device. Additionally, any objects can be processed using Lenses®, such as a human's face and parts of a human body, animals, or non-living things such as chairs, cars, or other objects.

In some embodiments, when a Lenses® is selected along with content to be transformed, elements to be transformed by the Lenses® are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each of element of an object are calculated (e.g. using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method a background of the modified object can be changed or distorted as well by tracking and modifying the background.

In one or more embodiments, transformations changing some areas of an object using its elements can be performed by calculating of characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve: changing color of areas; removing at least some part of areas from the frames of the video stream; including one or more new objects into areas which are based on a request for modification; and modifying or distorting the elements of an area or object. In various embodiments, any combination of such modifications or other similar modifications may be used.

In some embodiments, Lenses® may provide augmented reality (AR) experiences. For example the AR experiences may provide an interactive experience of a real-world environment where the objects within the real-world environment are enhanced by computer-generated information such as video and audio.

In some embodiments of Lenses® using face detection, the face is detected on an image with use of a specific face detection algorithm (e.g. Viola-Jones). Then, an Active Shape Model (ASM) algorithm is applied to the face region of an image to detect facial feature reference points.

In other embodiments, other methods and algorithms suitable for face detection can be used. For example, in some embodiments, features are located using a landmark which represents a distinguishable point present in most of the images under consideration. For facial landmarks, for example, the location of the left eye pupil may be used. In an initial landmark is not identifiable (e.g. if a person has an eyepatch), secondary landmarks may be used. Such landmark identification procedures may be used for any such objects. In some embodiments, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some embodiments, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable and the shape model pools the results of the weak template matchers to form a stronger overall classifier. The entire search is repeated at each level in an image pyramid, from coarse to fine resolution.

Embodiments of a transformation system can capture an image or video stream on a client device and perform complex image manipulations locally on a client device such as client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on a client device.

In some example embodiments, Lenses® may be used by a system where a user may capture an image or video stream of the user (e.g., a selfie) using a client device 102 having a neural network operating as part of a messaging application 104 operating on the client device 102. The transform system operating within the messaging application 104 determines the presence of a face within the image or video stream and provides modification icons associated with the Lenses®, or the Lenses® may be present as associated with an interface described herein. The modification icons include changes which may be the basis for modifying the user's face within the image or video stream as part of the Lenses® operation. Once a modification icon is selected, the transform system initiates a process to convert the image of the user to reflect the selected modification icon (e.g., generate a smiling face on the user). In some embodiments, a modified image or video stream may be presented in a graphical user interface displayed on the mobile client device as soon as the image or video stream is captured and a specified modification is selected. The transform system may implement a complex convolutional neural network on a portion of the image or video stream to generate and apply the selected modification. That is, the user may capture the image or video stream and be presented with a modified result in real time or near real time once a modification icon has been selected. Further, the modification may be persistent while the video stream is being captured and the selected modification icon remains toggled. Machine taught neural networks may be used to enable such modifications.

In some embodiments, the graphical user interface, presenting the modification performed by the transform system, may supply the user with additional interaction options. Such options may be based on the interface used to initiate the content capture and Lenses® selection (e.g. initiation from a content creator user interface) In various embodiments, a modification may be persistent after an initial selection of a modification icon. The user may toggle the modification on or off by tapping or otherwise selecting the face being modified by the transformation system. and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified or such modifications may be individually toggled by tapping or selecting the individual face or a series of individual faces displayed within the graphical user interface.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., each user for which a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

FIG. 4 is a schematic diagram illustrating a structure of a message 400, according to some in some embodiments, generated by a messaging client application 104 for communication to a further messaging client application 204 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 406: text, to be generated by a user via a user interface of the client device 102 and that is included in the message 400.

A message image payload 408: image data, captured by a camera component of a client device 102 or retrieved from a memory component of a client device 102, and that is included in the message 400.

A message video payload 412: video data, captured by a camera component or retrieved from a memory component of the client device 102 and that is included in the message 400.

A message audio payload 416: audio data, captured by a microphone or retrieved from a memory component of the client device 102, and that is included in the message 400.

A message annotations 420: annotation data (e.g., filters, stickers or other enhancements) that represents annotations to be applied to message image payload 408, message video payload 412, or message audio payload 416 of the message 400.

A message duration parameter 424: parameter value indicating, in seconds, the amount of time for which content of the message (e.g., the message image payload 408, message video payload 412, message audio payload 416) is to be presented or made accessible to a user via the messaging client application 104.

A message geolocation parameter 426: geolocation data (e.g., latitudinal and longitudinal coordinates) associated with the content payload of the message. Multiple message geolocation parameter 426 values may be included in the payload, each of these parameter values being associated with respect to content items included in the content (e.g., a specific image into within the message image payload 408, or a specific video in the message video payload 412).

A message story identifier 428: identifier values identifying one or more content collections (e.g., "stories") with which a particular content item in the message image payload 408 of the message 400 is associated. For example, multiple images within the message image payload 408 may each be associated with multiple content collections using identifier values.

A message tag 430: each message 400 may be tagged with multiple tags, each of which is indicative of the subject matter of content included in the message payload. For example, where a particular image included in the message image payload 408 depicts an animal (e.g., a lion), a tag value may be included within the message tag 430 that is indicative of the relevant animal. Tag values may be generated manually, based on user input, or may be automatically generated using, for example, image recognition.

A message sender identifier 432: an identifier (e.g., a messaging system identifier, email address, or device identifier) indicative of a user of the client device 102 on which the message 400 was generated and from which the message 400 was sent A message receiver identifier 434: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 408 may be a pointer to (or address of) a location within an image table 414. Similarly, values within the message video payload 412 may point to data stored within a video table 418, values stored within the message annotations 420 may point to data stored in an annotation table 422, values stored within the message story identifier 428 may point to data stored in a story table 410, and values stored within the message sender identifier 432 and the message receiver identifier 434 may point to user records stored within an entity table 404.

FIG. 5 is a schematic diagram illustrating an access-limiting process 500, in terms of which access to content (e.g., an ephemeral message 502, and associated multimedia payload of data) or a content collection (e.g., an ephemeral message group 506) may be time-limited (e.g., made ephemeral).

An ephemeral message 502 is shown to be associated with a message duration parameter 508, the value of which determines an amount of time that the ephemeral message 502 will be displayed to a receiving user of the ephemeral message 502 by the messaging client application 104. In one embodiment, an ephemeral message 502 is viewable by a receiving user for up to a maximum of 10 seconds, depending on the amount of time that the sending user specifies using the message duration parameter 508.

The message duration parameter 508 and the message receiver identifier 518 are shown to be inputs to a message timer 514, which is responsible for determining the amount of time that the ephemeral message 502 is shown to a particular receiving user identified by the message receiver identifier 518. In particular, the ephemeral message 502 will only be shown to the relevant receiving user for a time period determined by the value of the message duration parameter 508. The message timer 514 is shown to provide output to a more generalized ephemeral timer system 504, which is responsible for the overall timing of display of content (e.g., an ephemeral message 502) to a receiving user.

The ephemeral message 502 is shown in FIG. 5 to be included within an ephemeral message group 506 (e.g., a collection of messages in a personal story, or an event story). The ephemeral message group 506 has an associated group duration parameter 510, a value of which determines a time-duration for which the ephemeral message group 506 is presented and accessible to users of the messaging system 100. The group duration parameter 510, for example, may be the duration of a music concert, where the ephemeral message group 506 is a collection of content pertaining to that concert. Alternatively, a user (either the owning user or a curator user) may specify the value for the group duration parameter 510 when performing the setup and creation of the ephemeral message group 506.

Additionally, each ephemeral message 502 within the ephemeral message group 506 has an associated group participation parameter 512, a value of which determines the duration of time for which the ephemeral message 502 will be accessible within the context of the ephemeral message group 506. Accordingly, a particular ephemeral message group 506 may "expire" and become inaccessible within the context of the ephemeral message group 506, prior to the ephemeral message group 506 itself expiring in terms of the group duration parameter 510. The group duration parameter 510, group participation parameter 512, and message receiver identifier 518 each provide input to a group timer 516, which operationally determines, firstly, whether a particular ephemeral message 502 of the ephemeral message group 506 will be displayed to a particular receiving user and, if so, for how long. Note that the ephemeral message group 506 is also aware of the identity of the particular receiving user as a result of the message receiver identifier 518.

Accordingly, the group timer 516 operationally controls the overall lifespan of an associated ephemeral message group 506, as well as an individual ephemeral message 502 included in the ephemeral message group 506. In one embodiment, each and every ephemeral message 502 within the ephemeral message group 506 remains viewable and accessible for a time-period specified by the group duration parameter 510. In a further embodiment, a certain ephemeral message 502 may expire, within the context of ephemeral message group 506, based on a group participation parameter 512. Note that a message duration parameter 508 may still determine the duration of time for which a particular ephemeral message 502 is displayed to a receiving user, even within the context of the ephemeral message group 506. Accordingly, the message duration parameter 508 determines the duration of time that a particular ephemeral message 502 is displayed to a receiving user, regardless of whether the receiving user is viewing that ephemeral message 502 inside or outside the context of an ephemeral message group 506.

The ephemeral timer system 504 may furthermore operationally remove a particular ephemeral message 502 from the ephemeral message group 506 based on a determination that it has exceeded an associated group participation parameter 512. For example, when a sending user has established a group participation parameter 512 of 24 hours from posting, the ephemeral timer system 504 will remove the relevant ephemeral message 502 from the ephemeral message group 506 after the specified 24 hours. The ephemeral timer system 504 also operates to remove an ephemeral message group 506 either when the group participation parameter 512 for each and every ephemeral message 502 within the ephemeral message group 506 has expired, or when the ephemeral message group 506 itself has expired in terms of the group duration parameter 510.

In certain use cases, a creator of a particular ephemeral message group 506 may specify an indefinite group duration parameter 510. In this case, the expiration of the group participation parameter 512 for the last remaining ephemeral message 502 within the ephemeral message group 506 will determine when the ephemeral message group 506 itself expires. In this case, a new ephemeral message 502, added to the ephemeral message group 506, with a new group participation parameter 512, effectively extends the life of an ephemeral message group 506 to equal the value of the group participation parameter 512.

Responsive to the ephemeral timer system 504 determining that an ephemeral message group 506 has expired (e.g., is no longer accessible), the ephemeral timer system 504 communicates with the messaging system 100 (and, for example, specifically the messaging client application 104 to cause an indicium (e.g., an icon) associated with the relevant ephemeral message group 506 to no longer be displayed within a user interface of the messaging client application 104. Similarly, when the ephemeral timer system 202 determines that the message duration parameter 508 for a particular ephemeral message 502 has expired, the ephemeral timer system 504 causes the messaging client application 104 to no longer display an indicium (e.g., an icon or textual identification) associated with the ephemeral message 502.

FIG. 6 is a block diagram illustrating components of the contextual media filter system 124 that configure the contextual media filter system 124 to capture an image frame that includes a depiction of an object from a client device 102, identify one or more objects within the image frame based on the depiction of the object, identify one or more image features based on the object, retrieve a set of media content based on the image features, and cause display of a presentation of the set of media content within the image frame at the client device 102, according to some example embodiments.

The contextual media filter system 124 is shown as including a presentation system 604, image feature computation system 606, a search system 608, and a geometric verification system 610, all configured to communicate with each other (e.g., via bus, shared memory, or a switch). Any one or more of these systems may be implemented using one or more processors (e.g., by configuring such one or more processors to preform functions described for that system and hence may include one or more processors).

Any one or more of the systems described may be implemented using hardware alone (e.g., one or more of the processors of a machine) or a combination of hardware and software. For example, any system described of the contextual media filter system 124 may physically include an arrangement of one or more of the processors (e.g., a subset of or among the one or more processors of the machine) configured to perform the operations described herein for that system. As another example, any system of the contextual media filter system 124 may include software, hardware, or both, that configure an arrangement of one or more processors (e.g., among the one or more processors of the machine) to perform the operations described herein for that system. Accordingly, different systems of the contextual media filter system 124 may include and configure different arrangements of such processors or a single arrangement of such processors at different points in time. Moreover, any two or more systems of the contextual media filter system 124 may be combined into a single system, and the functions described herein for a single system may be subdivided among multiple systems. Furthermore, according to various example embodiments, systems described herein as being implemented within a single machine, database, or device may be distributed across multiple machines, databases, or devices.

FIG. 7 is a flowchart depicting a method 700 of causing display of a contextual media filter at a client device 102, according to certain example embodiments. Operations of the method 700 may be performed by the systems described above with respect to FIG. 6. As showing in FIG. 7, the method 700 includes one or more operations 702, 704, 706, 708, and 710.

At operation 702 the communication system 602 receives an input from the client device 102. In some embodiments, the client device 102 includes a touch-screen display configured to receive tactile inputs. The input may therefore include a tactile input onto a display of the client device 102, wherein the tactile input provides an indication of a point or position within the graphical user interface (GUI). For example, a user of the client device 102 may provide an input to identify a location or object depicted within the GUI by providing a tactile input onto a location along the display that corresponds with a position of the location or object within the GUI.

In some embodiments, the input may comprise one or more input properties that include an input pressure, an input duration, and an input location. In such embodiments, the communication system 602may compare one or more of the input properties against a set of threshold values. For example, responsive to detecting an input property transgress a threshold value, the communication system 602 may signal one or more systems of the contextual media filter system 124 to perform certain follow-up actions or operations.

At operation 704, the presentation system 604 causes display of a of a GUI at the client device 102, where the GUI comprises a display of live camera data streamed from a camera of or associated with the client device 102. For example, the client device 102 may include a plurality of cameras such as one or more "front-facing" cameras, and one or more "back-facing" cameras, configured to capture and stream image data. The live camera data generated by the one or more cameras associated with the client device 102 may include image data that comprises a plurality of image features.

At operation 706 the image feature computation system 606 identifies the object within the image frame. The contextual media filter system 124 compares media content within the media repository (e.g., a database) and select those media content which are most visually similar to the object within the image frame. The visual similarity comparison is a unified abstraction and representation of the media content such that the similarity between two media content captured under, for example, different resolutions, angles, illuminations and other factors can be computed using the representation.

The image feature computation system 606 identifies local features that are computed from specific regions within the image frame. The local features are stored in an indexing structure. An indexing structure is a data structure that makes searching a database more efficient. Therefore, querying an index is faster than searching each row in a database.

Each local feature is further analyzed to compute global features of the image frame. Global features are computed from the entire image frame, not specific regions within the image frame. In one example, the global features are computed by quantizing local features of the image frame. Quantization involved in image processing is a technique achieved by compressing a range of values to a single value. The global features are computed by mapping each local feature to a representative feature in a set of representative features. Each representative feature may be referred to as a "word." The global feature is computed by counting an occurrence of each representative feature in the set of representative features.

For example, a set of representative features may be (A, B, C, D, . . . ). The image feature computation system 606 may have computed 5 local features from the image. Two local features are mapped to "word" A, and 3 local features are mapped to "word" D. The global feature can be represented as "2AOBOC3D."

At operation 708, the search system 608 accesses media content associated with the object with the media repository in response to identifying the object. The search system 608 uses the global feature to search for media content within the indexing structure to retrieve media content from the media repository associated with object. In some examples, the search system 608 uses the k-nearest neighbors algorithm in performing the search.

At operation 708, the contextual media filter system 124 further verifies the media content using the geometric verification system 610. The media content returned by the search performed by the search system 608 may contain false media content matches that are not visually similar to the original object within the image frame. The geometric verification system 610 may use a similarity metric in determining whether a media content item is similar to the original object. The similarity metric may relate to a geometric constraint associated with the geometry of the original object. Therefore, the geometric verification system 610 identifies false media content using geometric verification and removes the false media content from the media content.

At operation 710, the presentation system 604 causes presentation of the media content within the image frame at the client device 102. For example, the presentation of the set of media content may include an AR display of the set of media content, such that the retrieved media content appears to interact with elements depicted within the image frame, in real time.

In some embodiments, to generate the presentation of the media content, the presentation system 604 retrieves a media template, wherein the media template defines a presentation format and layout to be applied to the set of media content. For example, the media template may define positions and orientations to present the media content within the image frame, at the client device 102. The media content may be tagged with location information or temporal information within the media repository, such that reference to a particular time of day, season, day of week, month, or place, may identify a set of relevant media content.

FIG. 8 is a diagrammatic illustration of an object 800 within an image frame at a client device. In some examples the object is a custom image that can be tracked within the image frame.

FIG. 9 is a diagrammatic illustrations of a contextual media filter system 124 within a user interface 900 of a client device 102. The contextual media filter system 124 may be initialized by initiating a scan of the image frame. Once the contextual media filter system 124 determines the media content associated with the object within the image frame, the contextual media filter system 124 may display a set of media content 902 that a user of a client device may swipe to select.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1010 provide a low-level common infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a high-level common infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example embodiment, the applications 1006 may include a home application 1036, a contacts application 1030, a browser application 1032, a book reader application 1034, a location application 1042, a media application 1044, a messaging application 1046, a game application 1048, and a broad assortment of other applications such as third-party applications 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party applications 1040 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 1040 can invoke the API calls 1050 provided by the operating system 1012 to facilitate functionality described herein.

FIG. 11 is a diagrammatic representation of a machine 1100 within which instructions 1108 (e.g., software, a program, an application, an applet, an app, or other executable code) for causing the machine 1100 to perform any one or more of the methodologies discussed herein may be executed. For example, the instructions 1108 may cause the machine 1100 to execute any one or more of the methods described herein. The instructions 1108 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1108, sequentially or otherwise, that specify actions to be taken by the machine 1100. Further, while only a single machine 1100 is illustrated, the term "machine" shall also be taken to include a collection of machines that individually or jointly execute the instructions 1108 to perform any one or more of the methodologies discussed herein.

The machine 1100 may include processors 1102, memory 1104, and I/O components 1142, which may be configured to communicate with each other via a bus 1144. In an example embodiment, the processors 1102 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1106 and a processor 1110 that execute the instructions 1108. The term "processor" is intended to include multi-core processors that may comprise two or more independent processors (sometimes referred to as "cores") that may execute instructions contemporaneously. Although FIG. 11 shows multiple processors 1102, the machine 1100 may include a single processor with a single core, a single processor with multiple cores (e.g., a multi-core processor), multiple processors with a single core, multiple processors with multiples cores, or any combination thereof.

The memory 1104 includes a main memory 1112, a static memory 1114, and a storage unit 1116, both accessible to the processors 1102 via the bus 1144. The main memory 1104, the static memory 1114, and storage unit 1116 store the instructions 1108 embodying any one or more of the methodologies or functions described herein. The instructions 1108 may also reside, completely or partially, within the main memory 1112, within the static memory 1114, within machine-readable medium 1118 within the storage unit 1116, within at least one of the processors 1102 (e.g., within the processor's cache memory), or any suitable combination thereof, during execution thereof by the machine 1100.

The I/O components 1142 may include a wide variety of components to receive input, provide output, produce output, transmit information, exchange information, capture measurements, and so on. The specific I/O components 1142 that are included in a particular machine will depend on the type of machine. For example, portable machines such as mobile phones may include a touch input device or other such input mechanisms, while a headless server machine will likely not include such a touch input device. It will be appreciated that the I/O components 1142 may include many other components that are not shown in FIG. 11. In various example embodiments, the I/O components 1142 may include output components 1128 and input components 1130. The output components 1128 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1130 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1142 may include biometric components 1132, motion components 1134, environmental components 1136, or position components 1138, among a wide array of other components. For example, the biometric components 1132 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1134 include acceleration sensor components (e.g., accelerometer), gravitation sensor components, rotation sensor components (e.g., gyroscope), and so forth. The environmental components 1136 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1138 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1142 further include communication components 1140 operable to couple the machine 1100 to a network 1120 or devices 1122 via a coupling 1124 and a coupling 1126, respectively. For example, the communication components 1140 may include a network interface component or another suitable device to interface with the network 1120. In further examples, the communication components 1140 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1122 may be another machine or any of a wide variety of peripheral devices (e.g., a peripheral device coupled via a USB).

Moreover, the communication components 1140 may detect identifiers or include components operable to detect identifiers. For example, the communication components 1140 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1140, such as location via Internet Protocol (IP) geolocation, location via Wi-Fi® signal triangulation, location via detecting an NFC beacon signal that may indicate a particular location, and so forth.

The various memories (e.g., memory 1104, main memory 1112, static memory 1114, and/or memory of the processors 1102) and/or storage unit 1116 may store one or more sets of instructions and data structures (e.g., software) embodying or used by any one or more of the methodologies or functions described herein. These instructions (e.g., the instructions 1108), when executed by processors 1102, cause various operations to implement the disclosed embodiments.

The instructions 1108 may be transmitted or received over the network 1120, using a transmission medium, via a network interface device (e.g., a network interface component included in the communication components 1140) and using any one of a number of well-known transfer protocols (e.g., hypertext transfer protocol (HTTP)). Similarly, the instructions 1108 may be transmitted or received using a transmission medium via the coupling 1126 (e.g., a peer-to-peer coupling) to the devices 1122.

What is claimed is:
1. A computer-implemented method comprising:
 capturing an image frame at a client device, the image frame comprising a depiction of an object;

identifying the object within the image frame, the identifying the object within the image frame comprising:
identifying a first set of image features within the image frame;
storing the first set of features in an indexing structure;
identifying a second set of image features based on the first set of image features by mapping each feature in the first set of image features to a representative feature in a set of representative features;
searching the indexing structure using the second set of image features;
accessing media content associated with the object in response to identifying the object within the image frame;
verifying the accessed media content based on a geometric constraint associated with a geometry of the object;
accessing a media template, the media template defining a set of presentation positions within a graphical user interface of the client device, the set of presentation positions corresponding to presentation positions of the accessed media content; and
in response to verifying the accessed media content, causing presentation of the media content within the image frame at the client device based on the accessed media template.

2. The method of claim 1,
wherein defining the set of presentation positions comprises defining one or both of a presentation format and a layout of the accessed media content.

3. The method of claim 2, wherein defining the set of presentation positions comprises defining an orientation of the accessed media content.

4. The method of claim 1, wherein the accessed media content comprises a plurality of augmented reality experience selections.

5. The method of claim 4, wherein the plurality of augmented reality experience selections are configured to interact with the object within the image frame in real time.

6. The method of claim 4, wherein the plurality of augmented reality experience selections is associated with a plurality of special effects, respectively.

7. The method of claim 1, further comprising:
receiving an initiation of an input comprising a tactile input onto the graphical user interface of the client device;
detecting that a property of the tactile input transgresses a threshold value; and
capturing the image frame in response to the property of the tactile input transgressing the threshold value.

8. The method of claim 1, wherein the first set of features are local features identified within predefined regions within the image frame.

9. The method of claim 1, wherein the second set of image features are global features identified using an entirety of the image frame.

10. The method of claim 1, wherein the image frame is received from a messaging application on the client device.

11. A system comprising:
a processor; and
a memory storing instructions that, when executed by the processor, configure the processor to perform operations comprising:
capturing an image frame at a client device, the image frame comprising a depiction of an object;
identifying the object within the image frame, the identifying the object within the image frame comprising:
identifying a first set of image features within the image frame;
storing the first set of features in an indexing structure;
identifying a second set of image features based on the first set of image features by mapping each feature in the first set of image features to a representative feature in a set of representative features;
searching the indexing structure using the second set of image features;
accessing media content associated with the object in response to identifying the object within the image frame;
verifying the accessed media content based on a geometric constraint associated with a geometry of the object;
accessing a media template, the media template defining a set of presentation positions within a graphical user interface of the client device, the set of presentation positions corresponding to presentation positions of the accessed media content; and
in response to verifying the accessed media content, causing presentation of the media content within the image frame at the client device based on the accessed media template.

12. The system of claim 11,
wherein defining the set of presentation positions comprises defining one or both of a presentation format and a layout of the accessed media content, wherein defining the set of presentation positions comprises defining one or both of a presentation format and a layout of the accessed media content.

13. The system of claim 12, wherein defining the set of presentation positions comprises defining an orientation of the accessed media content.

14. The system of claim 11, wherein the accessed media content comprises a plurality of augmented reality experience selections.

15. The system of claim 14, wherein the plurality of augmented reality experience selections are configured to interact with the object within the image frame in real time.

16. The system of claim 14, wherein the plurality of augmented reality experience selections is associated with a plurality of special effects, respectively.

17. The system of claim 11, further comprising:
receiving an initiation of an input comprising a tactile input onto the graphical user interface of the client device;
detecting that a property of the tactile input transgresses a threshold value; and
capturing the image frame in response to the property of the tactile input transgressing the threshold value.

18. The system of claim 11, wherein the first set of features are local features identified within predefined regions within the image frame.

19. The system of claim 11, wherein the second set of image features are global features identified using an entirety of the image frame.

20. A non-transitory machine-readable storage medium comprising instructions that, when executed by one or more processors of a machine, cause the machine to perform operations comprising:
capturing an image frame at a client device, the image frame comprising a depiction of an object;
identifying the object within the image frame, the identifying the object within the image frame comprising:
identifying a first set of image features within the image frame;
storing the first set of features in an indexing structure;

identifying a second set of image features based on the first set of image features by mapping each feature in the first set of image features to a representative feature in a set of representative features;
searching the indexing structure using the second set of image features;
accessing media content associated with the object in response to identifying the object within the image frame;
verifying the accessed media content based on a geometric constraint associated with a geometry of the object;
accessing a media template, the media template defining a set of presentation positions within a graphical user interface of the client device, the set of presentation positions corresponding to presentation positions of the accessed media content; and
in response to verifying the accessed media content, causing presentation of the media content within the image frame at the client device based on the accessed media template.

* * * * *